United States Patent
Langkafel et al.

(10) Patent No.: US 7,343,605 B2
(45) Date of Patent: Mar. 11, 2008

(54) SYSTEM AND METHOD FOR COMMUNICATING BETWEEN SOFTWARE APPLICATIONS, PARTICULARLY MES (MANUFACTURING EXECUTION SYSTEM) APPLICATIONS

(75) Inventors: Dirk Langkafel, Erlangen (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 630 days.

(21) Appl. No.: 10/499,737

(22) PCT Filed: Nov. 28, 2002

(86) PCT No.: PCT/DE02/04376

§ 371 (c)(1),
(2), (4) Date: Jun. 8, 2004

(87) PCT Pub. No.: WO03/050680

PCT Pub. Date: Jun. 19, 2003

(65) Prior Publication Data

US 2005/0010931 A1    Jan. 13, 2005

(30) Foreign Application Priority Data

Dec. 12, 2001   (DE) ................ 101 61 064

(51) Int. Cl.
G06F 13/14 (2006.01)
G06F 13/38 (2006.01)
G06F 9/06 (2006.01)

(52) U.S. Cl. ............... 719/316; 719/313; 719/314; 719/315; 703/9; 700/19; 700/28; 700/83

(58) Field of Classification Search ........ 719/313–315, 719/316; 714/2–13, 37, 746; 700/19, 28, 700/83; 703/9
See application file for complete search history.

(56) References Cited

U.S. PATENT DOCUMENTS

| | | | |
|---|---|---|---|
| 5,557,798 A | | 9/1996 | Skeen et al. |
| 5,724,532 A | | 3/1998 | Thomson |
| 5,890,155 A | * | 3/1999 | Steinman et al. ............... 707/9 |
| 5,909,368 A | * | 6/1999 | Nixon et al. .................. 700/2 |
| 5,995,916 A | * | 11/1999 | Nixon et al. ................ 702/182 |

(Continued)

FOREIGN PATENT DOCUMENTS

WO     WO 01/02953 A1    1/2001

OTHER PUBLICATIONS

Mike May, "The Creative Destruction of EAI", EAI Journal, Oct. 2001, pp. 56-58.

(Continued)

*Primary Examiner*—William Thomson
*Assistant Examiner*—Richard Pantoliano, Jr.

(57) ABSTRACT

Applications to be connected, particularly MES (manufacturing execution system) applications, as well as the communications mechanisms are depicted in the object model of the framework (IF; IF meaning industrial framework) by using wrappers and/or adapters and, as a result, can be manipulated in a uniformly homogenous manner in the framework. The invention is advantageous in that the very heterogeneous structures of the applications are depicted on a common model and can be comfortably and easily used by a user by means of generic mechanisms. That is to say that the effort of programming is eliminated and, as a result, this communication can be easily projected by establishing a so-called connection.

18 Claims, 6 Drawing Sheets

U.S. PATENT DOCUMENTS

| | | | | |
|---|---|---|---|---|
| 6,029,181 | A | * | 2/2000 | Milakovich et al. ........ 715/523 |
| 6,032,208 | A | * | 2/2000 | Nixon et al. .................. 710/64 |
| 6,098,116 | A | * | 8/2000 | Nixon et al. .................... 710/8 |
| 6,104,963 | A | * | 8/2000 | Cebasek et al. .............. 700/86 |
| 6,115,646 | A | | 9/2000 | Fiszman et al. |
| 6,119,125 | A | * | 9/2000 | Gloudeman et al. .... 707/103 R |
| 6,138,143 | A | * | 10/2000 | Gigliotti et al. ............ 709/203 |
| 6,141,595 | A | * | 10/2000 | Gloudeman et al. ......... 700/83 |
| 6,167,316 | A | * | 12/2000 | Gloudeman et al. ........... 700/2 |
| 6,195,591 | B1 | * | 2/2001 | Nixon et al. .................. 700/83 |
| 6,208,345 | B1 | * | 3/2001 | Sheard et al. ............... 715/853 |
| 6,240,326 | B1 | * | 5/2001 | Gloudeman et al. ......... 700/83 |
| 6,256,678 | B1 | | 7/2001 | Traughbert et al. |
| 6,336,085 | B1 | * | 1/2002 | Ueda et al. ..................... 703/9 |
| 6,434,435 | B1 | * | 8/2002 | Tubel et al. .................. 700/30 |
| 6,687,761 | B1 | * | 2/2004 | Collins et al. .............. 719/315 |
| 6,789,252 | B1 | * | 9/2004 | Burke et al. ................ 717/100 |
| 6,823,495 | B1 | * | 11/2004 | Vedula et al. ............... 715/805 |
| 6,957,110 | B2 | * | 10/2005 | Wewalaarachchi et al. ... 700/86 |
| 7,110,835 | B2 | * | 9/2006 | Blevins et al. ................ 700/83 |
| 7,159,185 | B1 | * | 1/2007 | Vedula et al. ............... 715/763 |
| 7,174,230 | B2 | * | 2/2007 | Arackaparambil et al. .... 700/96 |
| 2003/0006999 | A1 | * | 1/2003 | Carlson et al. ............. 345/713 |
| 2003/0197733 | A1 | * | 10/2003 | Beauchamp et al. ........ 345/764 |

OTHER PUBLICATIONS

Dirk Kozian, "Transparenz über die Abläufe schaffen", Elektrotechnik für die Automatisierung 11, Nov. 17, 1999, pp. 66, 68-69.

Hyperion Solutions Corporation, "Hyperion Application Link", 1999, XP-002201704, pp. 1-8.

Mesa International, "MES Explained: A High Level Vision", MESA International White Paper, No. 6, Sep. 1997, XP-002260218, pp. 1-24.

Zhonghua Yang and Keith Duddy, "CORBA: A Platform for Distributed Object Computing", Operating Systems Review, ACM Headquarters, New York, USA, vol. 30, No. 2, pp. 4-31.

Ulrich Lindner, "Massive Wiederverwendung: Konzepte, Techniken und Organisation", OBJEKT spektrum Jan. 1996, pp. 10, 12-14, 16-17.

Object Management Group, "The Common Object Request Broker: Architecture and Specification", Common Object Request Broker: Architecture and Specification, CORBA V2.0, Jul. 1995, XP-002132443, pp. 2-1/2-17, 4-1/4-6, 6-2/6-5 and 7-1/18-5.

Sara Williams and Charlie Kindel, "The Component Object Model, The Foundation for OLE Services", Dr. Dobb's Special Report, Dec. 21, 1994, Bd. 19, No. 16, pp. 14-22.

Joe Firmage, "Visual AppBuilder Architectural Overview", Novell Research, May/Jun. 1994, pp. 1-12.

* cited by examiner

SYSTEM AND METHOD FOR COMMUNICATING BETWEEN SOFTWARE APPLICATIONS, PARTICULARLY MES (MANUFACTURING EXECUTION SYSTEM) APPLICATIONS

CROSS REFERENCE TO RELATED APPLICATIONS

This application is the US National Stage of International Application No. PCT/DE02/04376, filed Nov. 28, 2002 and claims the benefit thereof. The International Application claims the benefits of German application No. 10161064.5 filed Dec. 12, 2001, both of the applications are incorporated by reference herein in their entirety.

FIELD OF INVENTION

The invention relates to a system for communicating between software applications, particularly MES applications, with at least one means of communication, at least one central processing unit for storing the software applications and at least one framework program coupling the software applications together.

The invention also relates to a respective method, a computer program, a computer program product and also a data processing apparatus.

BACKGROUND OF INVENTION

The employment of what are referred to as Manufacturing Execution Systems (MES) for automating production and/or manufacturing sequences is known from "Software für die Automatisierung—Transparenz über die Abläufe schaffen", an article by Dirk Kozian in Elektronik für die Automatisierung 11, Nov. 17, 1999. These systems integrate the automation level (controls) with the ERP systems (ERP: Enterprise Resource Planning) of the enterprise control level. Manufacturing Execution Systems are systems which provide information for optimizing production sequences, for example. In the first place, Manufacturing Execution Systems have to supplement the rough planning data of the ERP systems with plant-specific and up-to-date fine planning data and forward it correspondingly to the lower-placed automation layer; in the second place, they have the task of taking production-related information from the automation level, processing it and reporting it to the enterprise control level. MES systems therefore perform the task of vertical integration between the enterprise control level and the automation level. Typical individual tasks of MES systems comprise Enterprise Asset Management, Maintenance Management, Information Management, Scheduling, Dispatching and Trace & Track. These tasks are carried out by MES components or MES applications in each case.

Due to the software-related and data-related heterogeneity of the MES applications, however, they can only be integrated into a common system or project with very great difficulty and the exchange of data between these applications is only possible with some effort.

The integration of software components into a software system by means of what are referred to as adapters or by means of wrapping (packaging) is known from "Massive Wiederverwendung: Konzepte, Techniken und Organisation", an article by Ulrich Lindner in OBJEKTspektrum January 1996, pages 10-17. The aim in this respect is to increase the reusability of software components.

U.S. Pat. No. 5,557,798 describes a communication interface between software applications over which the applications can communicate with a high level of performance. The aim in this respect is also to be able to develop the applications independently of each other in a modular manner.

U.S. Pat. No. 6,115,646 describes a process automation system based on a heterogeneous distributed software system and an ORB (Object Request Broker). CORBA (Common Object Request Broker Architecture) is used as the ORB in this respect. The aim of this invention is to make workflow management services available.

SUMMARY OF INVENTION

The problem addressed by the present invention is to provide a system and a method for communicating between software applications, particularly MES applications, which allows the easy integration of heterogeneous applications in particular and the enabling of an efficient exchange of data between them.

The inventors took as their basis the finding that interoperability between heterogeneous software applications (e.g. MES applications) is achieved by the use of a framework program (Framework) using standardized interfaces such as OPC (OLE for Process Control); ActiveX, XML (eXtensible Markup Language) or SOAP (Simple Object Access Protocol). This achieves the principle of "any data, any time, anywhere" for a user in an MES project (a project for solving a task, e.g. order processing within an MES system). In other words, a user has access to all data at all times, irrespective of where it is located in the system. Furthermore, all the objects and data of the applications appear in the framework program in a homogeneous way since the objects or data of the applications are mapped to the object model (corresponding therefore to a uniform homogenous meta object model) of the framework program. This facilitates the establishment and manipulation of a communication link between the applications. A user can project a communication link between applications and does not need to program it laboriously.

A user (e.g. a System Integrator) gains a homogenous view across the overall system and does not need to have any specific (internal) knowledge of the application programs.

A first advantageous version of the present invention for a system consists in the communication link being transparent for a user and/or other systems with respect to the underlying means of communication. Due to the independence and transparency of the underlying means of communication, e.g. HTTP (Hyper Text Transfer Protocol), COM (Component Object Model), DCOM (Distributed Component Object Model) or MSMQ (Microsoft Message Queue), with respect to the projected communication link, a user can ignore these means of communication when projecting a communication link. Therefore, a user does not need to worry about the implementation details of that means of communication when projecting. Even in the integration or "connection" of the software applications to the framework program (e.g. by means of wrapping or by means of adapters), a user can ignore the underlying means of communication and does not need to know any implementation details of the means of communication.

A further advantageous version of the present invention for a system consists in the mapping to the object model being effected by means of adapters and/or wrapping. Adapter and wrapper technologies are familiar mechanisms in Information Technology for integrating software components into a system. A wrapper maps the API (Application Programmable Interface) of a foreign component (e.g. an MES application of a third-party supplier) into the object model of the framework program. Thus, for example, a method of the API of the foreign component becomes a method of the framework program or an integer data type of the API of the foreign component becomes an integer data type of the framework program, etc. The creation of a wrapper for a component to be integrated can be automated for COM (Component Object Model) objects. A wrapper corresponds to a bridge. Wrappers can be implemented very quickly.

Adapters are one level of abstraction higher than wrappers. They offer a uniform view of coupled applications. An adapter offers functionality to start up, operate, etc., the component to be coupled. An adapter corresponds to a "facade" in the language of design patterns.

A further advantageous version of the present invention for a system consists in the communication link being set up with a display device with input tools and/or via an autonomously operating program. This increases flexibility for the user. A communication link can be set up dynamically, i.e. at runtime, for example, by activating a batch. The autonomously operating program can be defined as a batch and used several times.

A further advantageous version of the present invention for a system consists in the communication link being set up between two or more objects by connecting the objects, which are shown in different screen areas of the display device, by means of a drag & drop operation with the aid of the input tools. Given a suitable user interface (e.g. with graphics support, drag & drop mechanisms, mouse input, voice input, etc.), the projecting becomes convenient and simple for the user.

According to the invention, the aforesaid problem is solved by a method that achieves the principle of "any data, any time, anywhere" for a user in an MES project (a project for solving a task, e.g. order processing within an MES system). In other words, a user has access to all data at all times, irrespective of where it is located in the system. Furthermore, all the objects and data of the applications appear in the framework program in a homogeneous way since the objects or data of the applications are mapped to the object model (corresponding therefore to a uniform homogeneous meta object model) of the framework program. This facilitates the establishment and manipulation of a communication link between the applications. A user can project a communication link between applications and does not need to program it laboriously.

A user (e.g. a System Integrator) gains a homogenous view across the overall system and does not need to have any specific (internal) knowledge of the application programs.

A further advantageous version of the present invention for a method consists in the communication link being transparent for a user and/or other systems with respect to the underlying means of communication. Due to the independence and transparency of the underlying means of communication, e.g. HTTP (Hyper Text Transfer Protocol), COM (Component Object Model), DCOM (Distributed Component Object Model) or MSMQ (Microsoft Message Queue), with respect to the projected communication link, a user can ignore these means of communication when projecting a communication link. Therefore, a user does not need to worry about the implementation details of that means of communication when projecting. Even in the integration or "connection" of the software applications to the framework program (e.g. by means of wrapping or by means of adapters), a user can ignore the underlying means of communication and does not need to know any implementation details of the means of communication since the means of communication are also mapped to the object model of the framework program.

A further advantageous version of the present invention for a method consists in the mapping to the object model being effected by means of adapters and/or wrapping. Adapter and wrapper technologies are familiar mechanisms in Information Technology for integrating software components into a system. A wrapper maps the API (Application Programmable Interface) of a foreign component (e.g. an MES application of a third-party supplier) into the object model of the framework program. Thus, for example, a method of the API of the foreign component becomes a method of the framework program or an integer data type of the API of the foreign component becomes an integer data type of the framework program, etc. The creation of a wrapper for a component to be integrated can be automated for COM (Component Object Model) objects. A wrapper corresponds to a bridge. Wrappers can be implemented very quickly.

Adapters are one level of abstraction higher than wrappers. They offer a uniform view of coupled applications. An adapter offers functionality to start up, operate, etc., the component to be coupled. An adapter corresponds to a "facade" in the language of design patterns.

A further advantageous version of the present invention for a method consists in the communication link being set up with a display device with input tools and/or via an autonomously operating program. This increases flexibility for the user. A communication link can be set up dynamically, i.e. at runtime, for example, by activating a batch. The autonomously operating program can be defined as a batch and used several times.

A further advantageous version of the present invention for a method consists in the communication link being set up between two or more objects by connecting the objects, which are shown in different screen areas of the display device, by means of a drag & drop operation with the aid of the input tools. Given a suitable user interface (e.g. with graphics support, drag & drop mechanisms, mouse input, voice input, etc.), the projecting becomes convenient and simple for the user.

A further advantageous version of the present invention consists in the method according to the invention being implemented by means of a computer program. This makes it possible to carry out any modifications or adaptations easily.

A further advantageous version of the present invention consists in the computer program for the method according to the invention being stored on a data carrier or a computer program product (floppy disk, CD, etc.). This makes the method easy to manipulate with respect to logistics and distribution.

A further advantageous version of the present invention consists in the computer program for the method according to the invention being installed on a data processing apparatus. This increases performance.

BRIEF DESCRIPTION OF THE DRAWINGS

Further advantages and details of the invention arise on the basis of the description of advantageous exemplary embodiments which now follows and in connection with the diagrams. Where elements with the same functionalities are described in different diagrams, they are labeled with the same reference symbols.

The diagrams show:

FIG. 1 the "enterprise pyramid" with three control levels, in a general outline diagram, FIG. 2 an exemplary general layout diagram with software and hardware units for MES solutions, FIG. 3 the central position of the framework program coupling the software applications, FIG. 4 the object structure of a component as a meta object model of the framework program in UML, FIG. 5 an example of the mapping of an application (WinCC) to a component as a meta object model of the framework program, FIG. 6 a further example of the mapping of an application (SAP) to a component as a meta object model of the framework program, FIG. 7 a communication link between MES applications, FIG. 8 the object structure of a connection in UML, FIG. 9 the schematic structure of an adapter and FIG. 10 screen areas for projecting a connection.

DETAILED DESCRIPTION OF INVENTION

Figure 1:
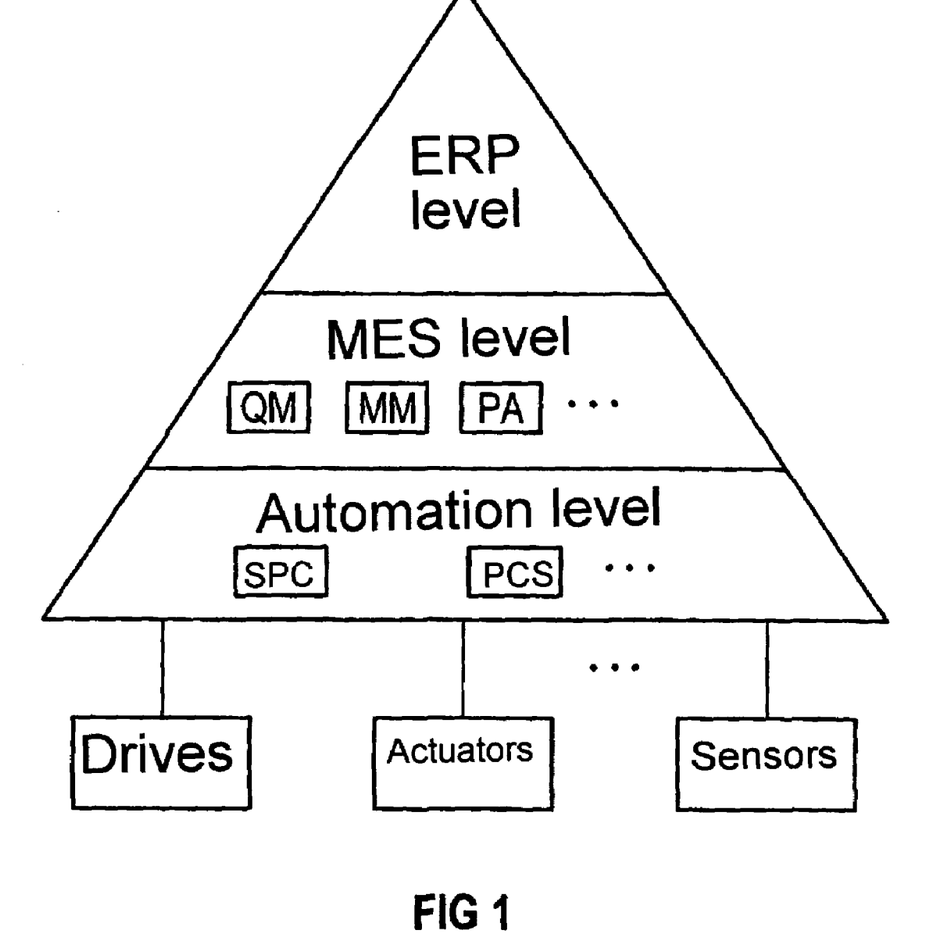

The diagram in FIG. 1 shows the three control levels as they are usually to be found in a producing or manufacturing enterprise, in a general outline diagram. The pyramid shape expresses the idea that information is condensed in the upward direction. The topmost level is the ERP (Enterprise Resource Planning) level. The business management and sales tasks in an enterprise (e.g. finance, sales, human resources and reporting) are usually carried out on this enterprise control level. But logistical tasks spanning production plants (e.g. order management and materials management) are also carried out on this level. The system SAP R/3 is an ERP system which is used very frequently on the enterprise control level.

The bottommost level of the pyramid is the automation level (controls). Stored-program controls (SPC) are usually employed on this level in conjunction with visualization and process control systems (PCS). The drives, actuators and sensors of the production and/or manufacturing apparatus are in direct connection with the systems on this level.

The connecting element between the ERP level and the automation level is formed by the MES level. The applications of the MES level therefore provide vertical integration between the ERP level and the automation level.

On the one hand, MES applications have to supplement the rough planning of the ERP systems with production plant-specific fine planning and forward it to the systems of the automation layer; on the other hand, it is the task of the MES applications to take up production-related data of the automation level, process it and forward it to the ERP level (enterprise control level).

Typical MES applications-comprise, for example, Quality Management (QM), Maintenance Management (MM), Performance Analysis (PA), Process Management, Labor Management and Asset Management. Three dots in each case express the idea in FIG. 1 that further elements (applications, systems, etc.) can be located on a level.

As a rule, MES systems or ERP systems contain what is referred to as a runtime system for time-based sequence control of the components involved (subcomponents, modules, tasks, operating system processes, etc.) and also what is referred to as an engineering system for creating and editing programs which are provided for execution in the runtime system.

Figure 2:
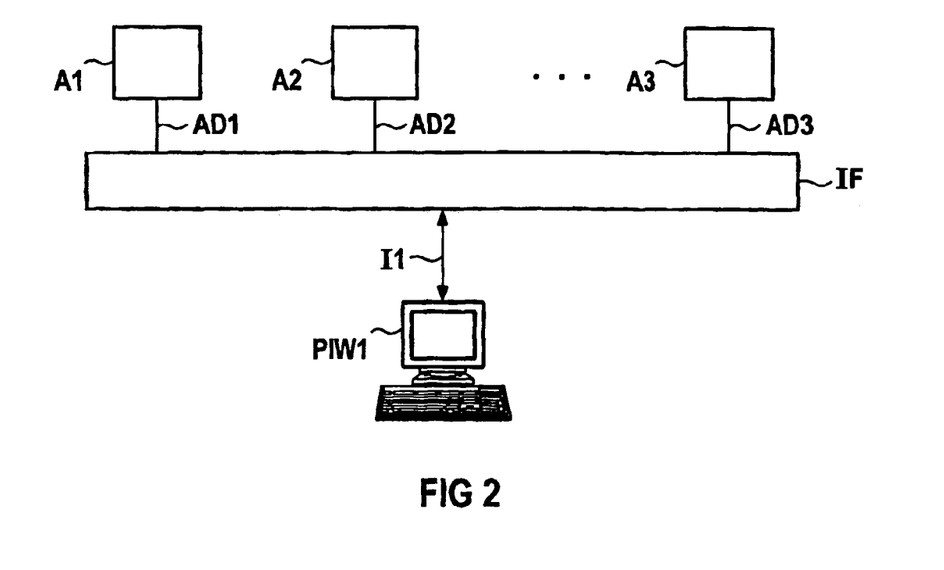

The diagram in FIG. 2 shows an exemplary general layout diagram with software and hardware units for MES solutions. The individual MES applications A1 to A3 are connected via adapters AD1 to AD3 to a framework program (Framework) IF. A user workstation PIW1 is coupled via a bidirectional information pathway I1 to the framework program IF and can therefore manage and monitor the MES applications attached to or integrated into it. The user workstation PIW1 usually consists of a display device (monitor, display, etc.), a data processing system (e.g. PC) with a processor and memory facilities and also input units (keyboard, mouse, etc.). The MES applications Al to A3 and also the framework program IF can run on dedicated data processing units or processors, but it is also possible for them to run on the data processing unit of the PIW1.

The respective MES applications A1 to A3 are connected via adapters AD1 to AD3 to the framework program IF. The adapters are therefore the coupling blocks between the framework program IF and the applications. Intrinsically heterogeneous applications can therefore also be connected to each other via the adapters and it is possible, due to the integration with the framework program IF, to communicate between the applications and operate the exchange of data. The adapters are software modules which set up connections to various applications. In typical integration scenarios, these comprise integrations relating to systems from the MES, ERP, SCADA or controls worlds. An adapter offers functionality to start up, operate, etc., a component to be coupled. An adapter allows access to data and functions of the program or application to be coupled, makes certain runtime data available and allows the loading of engineering information from the program or application to be coupled. Adapters can differ in terms of their structure and scope. Thus, for example, adapters can be permanently programmed or they can be configured or modeled. They can also differ with respect to the possibilities for access to the application to be coupled; thus, for example, adapters can permit only one data-related access but it is also possible for adapters to grant access to higher-value business processes. During start-up, the adapters are loaded together with the stored models and status information. At runtime, a check is then carried out as to whether and how the different integrated applications fit together. It is possible, via a visualization or monitoring component, to interrogate the status of an adapter and represent it (including graphically) on the user workstation PIW1. Adapters give the system and also the user a standardized and uniform view of applications (depending on what level of abstraction is present in the adapters).

A further option for integrating software components is to employ wrappers. A wrapper maps the API (Application Programmable Interface) of a foreign component (e.g. an MES application) into the object model of the framework program. Thus, for example, a method of the API of the foreign component becomes a method of the framework program or an integer data type of the API of the foreign component becomes an integer data type of the framework program.

Alongside MES applications, applications from the enterprise control level (Enterprise Resource Planning level) and from the automation level (controls level) can also be integrated via the framework program IF and monitored or managed via the workstation PIWI (the abbreviation PIW stands for Personalized Industrial Workplace). The framework program IF therefore forms an integration platform for the entire industrial sector. Different applications from the enterprise control level, the MES level and the automation level can be integrated by the framework program IF simply and cost-effectively with the aid of adapters and/or wrappers. The framework program IF must therefore be regarded as a middleware platform and as a manufacturing application integration tool. An end user (e.g. the plant operator) can see the respective status of the applications to be monitored via the workstation PIW1 and he can also access data and methods of the applications and furthermore, he can connect applications to each other by means of this access.

The framework program IF therefore makes it possible firstly to achieve a vertical integration of applications from different enterprise levels and secondly the framework program IF enables a horizontal integration of applications on the MES level.

The workstation PIW1 represents "One Window to the World"for an end user at the front end of MES applications or other applications from the enterprise. In other words, the workstation enables integrating access to different, including heterogeneous, applications in the enterprise via a common, uniform user interface. The end user of the workstation PIW1 can therefore monitor and manage all integrated MES or other applications from this one workstation. This workstation can be connected to the applications via the Internet, Intranet, LAN (Local Area Network) or other conceivable connections. It is also possible to configure this workstation as a mobile station, e.g. as a mobile terminal (PDA, mobile handset). This mobility would generate even further advantages for an end user.

Figure 3:
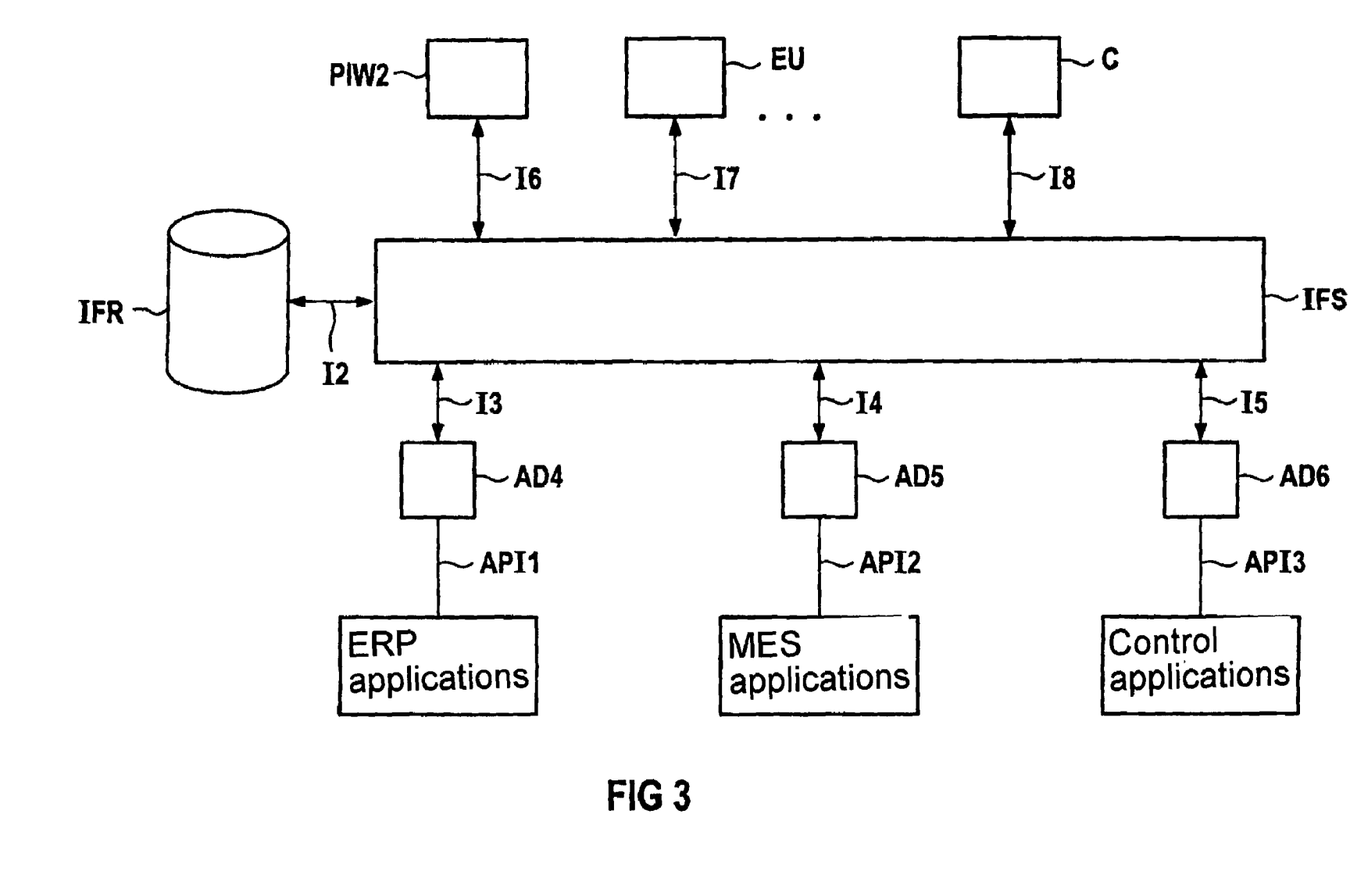

The diagram in FIG. 3 shows the central position of the framework program coupling the software applications. In order to implement the system or method according to the invention, it is natural to choose a client/server architecture. In this respect, the framework program (IF; FIG. 2) can be implemented on a single server or on several arbitrary servers which can be distributed in an IT environment. FIG. 3 shows that the framework program (IF; FIG. 2) is located on a server IFS (Industrial Framework Server). The clients are attached to this central server IFS, being connected by the bi-directional information pathways I2-I8. The clients include firstly the applications from the ERP, MES and automation levels. These applications are shown at the lower edge of the diagram in FIG. 3. These applications are connected to the framework program (IF; FIG. 2) and therefore the server IFS via the adapters AD4-AD6. The adapters AD4-AD6 are connected to the applications via API interfaces API1-API3 (API stands for Application Programmable Interface). An Application Programmable Interface represents an interface with a set of commands. APIs are also used in the conversion of lists of parameters from one format to another format and in the interpretation of the arguments in one or both directions. The APIs are, as it were, the glue between the applications and the adapters. The connection between the adapters AD4-AD6 and the framework program (IF; FIG. 2) (shown in FIG. 3 by means of the bi-directional information pathways I3-I5) takes place via suitable data formats (e.g. XML), suitable protocols (XOP, OPC, etc.) and suitable transport mechanisms (e.g. DCOM or MSMQ). HTTP (Hyper Text Transfer Protocol) can also be used in this respect. The protocol SOAP (Simple Object Access Protocol), based on XML (extensible Markup Language), can also be used for integrating the adapters AD4-AD6 into the framework program (IF; FIG. 2) or the associated server IFS. Clients or applications which support ActiveX documents or calls can be integrated particularly advantageously into the framework program (IF; FIG. 2) or the server IFS. Alongside adapters, the applications can also be linked to the framework program by means of wrappers or other integration mechanisms.

The repository IFR (Industrial Framework Repository) can be connected to the server IFS as a further client. The connection is shown by means of the bi-directional information pathway I2 in FIG. 3. The repository IFR is used in order to hold data in a secure and persistent manner. This data can be accessed via method calls. Objects, methods and runtime data are stored in the repository, among other things.

Further clients of the server IFS are shown in the upper half of the diagram. The Personalized Industrial Workplace PIW2 and any engineering environment EU present are clients of the server IFS. The Personalized Industrial Workplace PIW2 is connected to the framework program (IF; FIG. 2) or the server by means of the bi-directional information pathway I6, and the engineering environment EU correspondingly by means of the bi-directional information pathway I7. The three dots show that further clients can be attached to the server IFS. The fact that, moreover, a further client C, being connected by means of the information pathway I8, is attached to the server IFS is indicated in FIG. 3.

The connection of the clients IFR, PIW2, EU and C takes place correspondingly via APIs or via customary data formats (e.g. XML), customary protocols (XOP, OPC, etc.) and customary transport mechanisms (e.g. DCOM, HTTP or MSMQ).

The adapters AD4-AD6 that are employed enable access to data and also methods of the individual applications which they connect to the framework program (IF; FIG. 2) These adapters are very flexible and not defined on the basis of individual specific protocols or specific transport mechanisms. If the adapters are employed in a runtime environment, they are configured in such a way as to ensure that certain necessary data from an application is available in the server environment at the right time. As already noted, this can be effected via different protocols and transport mechanisms. Several adapters, which can also possess minor server properties (such as the execution of workflows, the provision of various communication options, etc.) can be located in a runtime environment. These adapters can run on the respective application computer. However, they do not need to run on only one machine; they can also be distributed.

Software applications, particularly MES (Manufacturing Execution Systems) applications, are often present in heterogeneous form; for example, they can possess different data formats or object models or be implemented in different programming languages. The system or method according to the invention makes it possible to integrate heterogeneous applications of this type with the aid of a framework program. Communication between these applications is effected on the basis of means of communication such as HTTP, DCOM, MSMQ, etc. However, the communication, i.e. the exchange of data, between the applications is independent of these means of communication, i.e. the applications can ignore the application means.

Figure 4:
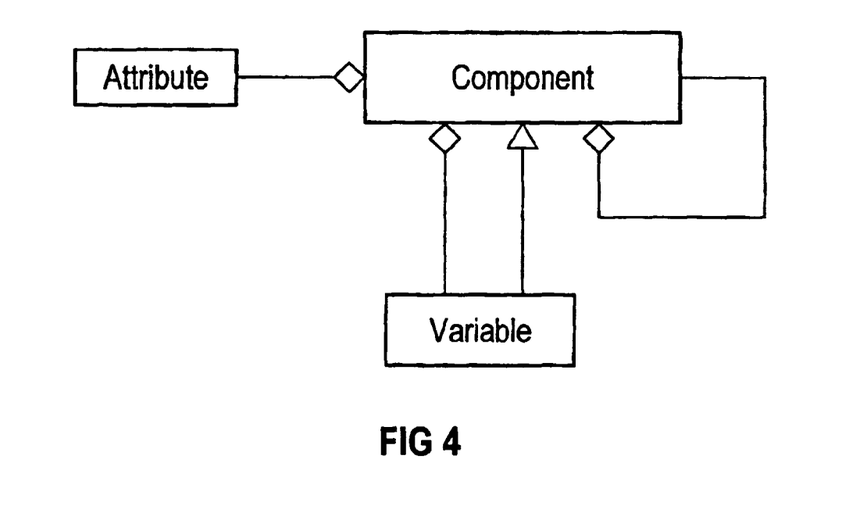

The diagram in FIG. 4 shows the object structure of a "component" as a meta object model of the framework program (IF; FIG. 2) in UML (Unified Modeling Language). In the system and method according to the invention, the software applications to be integrated and the underlying means of communication (e.g. HTTP, MSMQ, etc.) are mapped to an object model of the framework program (IF; FIG. 2). As a result, intrinsically heterogeneous applications possess a common object model. As a result, all the methods, data structures, objects, etc. of the foreign applications to be integrated are shown in a common object model. This object model is very generic and represents a meta object model. The core of this object model consists of an object type named "component". A component can in turn aggregate other components and/or contain specific types of components, referred to as variables, to which certain values are assigned in operation. Components and variables can also possess additional attributes in each case.

This object model forms the basis of the adaptation of MES applications or other applications. This means that the structures of the applications are translated or mapped to structures of this object model. All the applications to be integrated are represented in the diagram of this object model within the framework program (IF; FIG. 2). The underlying means of communication are also mapped to this generic object model. All applications and all underlying means of communication are then represented in a uniform and homogeneous object model in the framework program (IF; FIG. 2). As a result, communication links can be set up between the applications very simply and easily.

In the diagram in FIG. 4, the generic component "component", which represents the core of the object model, is presented in UML notation.

The square boxes represent parts of the object model. A lozenge link represents an aggregation (an 'is part of' link); a triangle represents inheritance (an 'is a' link). The diagram in FIG. 4 therefore shows that a component can consist of several components and furthermore, a component can be part of another component. A component is connected to attributes and variables by means of a lozenge link. In other words, a component can incorporate attributes and variables. Attributes are descriptive data. All the objects in a class possess the same attributes but generally different attribute values. An attribute value is a value allocated to an attribute from its value range. A variable can assume values of certain data types (e.g. integer, real, etc.). As is represented by the lozenge link, a component can contain several variables. However, a component can also be a superordinate class of a variable as is represented by the triangle link. In other words, a variable can be a derived component. The lozenge and triangle links can also incorporate cardinalities.

The software applications to be integrated and the underlying means of communication are mapped to this generic object structure, i.e. "component" structure, of the framework program (IF; FIG. 2) by means of mapping mechanisms such as adapters or wrappers.

Figure 5:
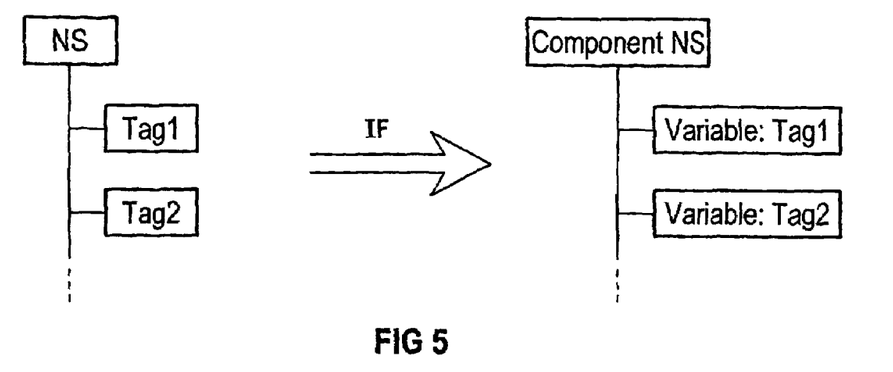

The diagram in FIG. 5 shows how the MES application WinCC (WinCC is the name of a process monitoring system produced by Siemens) is mapped to the "component" structure as shown in FIG. 4. The arrow in the middle of FIG. 5 shows that mapping, i.e. a conversion, is involved. The abbreviation IF above this arrow indicates that the mapping involves mapping into the object model of the Industrial Framework, i.e. the underlying framework program (IF; FIG. 2).

The object model of WinCC consists of name spaces (NS stands for Name Space) with what are referred to as "tags". Tags are simple data objects whose properties can be exchanged between server and clients. Their properties can be dynamic but also static. In an external application to be integrated, tags can be present in a flat or hierarchical name space. Tags can moreover be furnished with access rights (readable, writable, readable/writable). In an adapter, a tag is a placeholder (proxy) for an object of an external application to be integrated.

A distinction must be made in this respect to the effect that the term "tag" is used for markings in languages such as HTML and XML.

It is shown at the left-hand edge of FIG. 5 that the WinCC name space (NS) contains tag 1 and tag 2. Three dots show that it can also contain further tags. This structure is mapped to the "component" structure of the meta object model, as shown at the right-hand edge of FIG. 5, by means of adapters, wrappers or other mechanisms. The name space NS becomes the component NS which contains tag 1 and tag 2 as variables. Three dots show that the component NS can contain further elements. The chosen notation is based on the collaboration diagrams known from UML.

Figure 6:
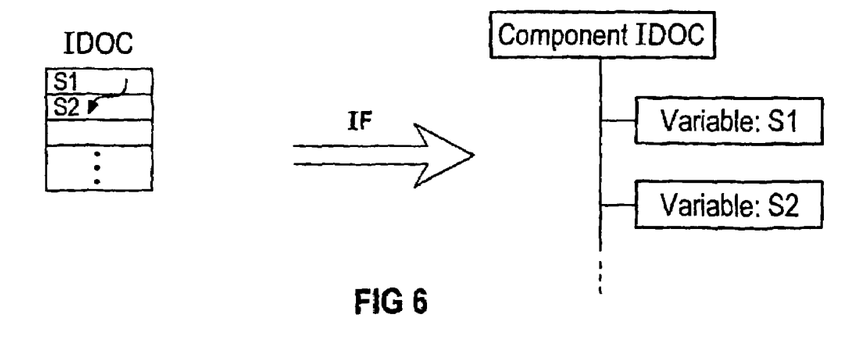

The diagram in FIG. 6 shows how a SAP application is mapped to the "component" structure (meta object model of the framework program). FIG. 6 also shows by means of the arrow placed in the middle that mapping or conversion is shown. The tabular IDOC structure of SAP applications is shown on the left-hand side of FIG. 6. In FIG. 6, the two entries S1 and S2 are represented in the table and furthermore an arrow from S1 to S2 shows that a reference from entry S1 to entry S2 is present. The three dots express the idea that an IDOC table can contain further elements. An IDOC table is mapped to a component IDOC of the object model of the framework program (IF; FIG. 2). The entries in the table (SI, S2) are mapped to variables of the component IDOC in each case. The chosen notation is based on the collaboration diagrams known from UML.

The underlying communication mechanisms (HTTP, MSMQ, DCOM, etc.) are also mapped to a "component" structure of this type in each case. This makes uniform and homogenous manipulation of the various means of communication possible.

Figure 7:
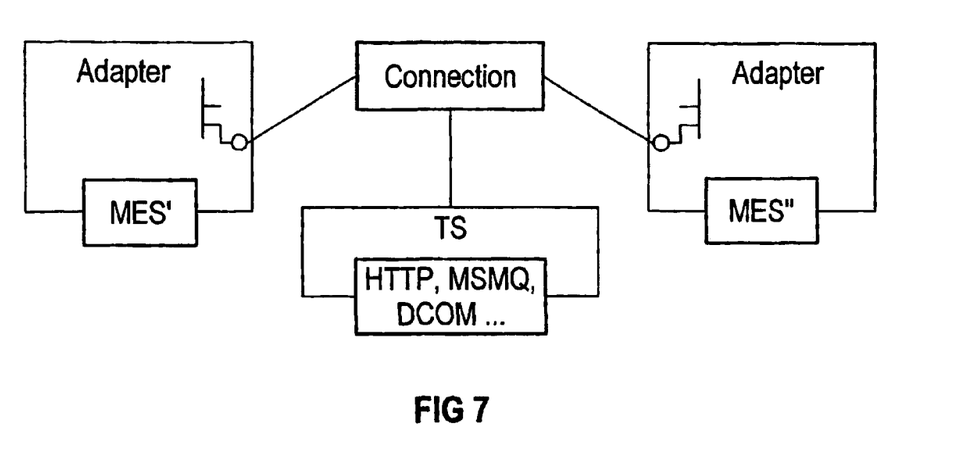

The diagram in FIG. 7 shows how a communication link is set up between MES applications. As already explained above, the applications and the underlying communication mechanisms are mapped to a uniform "component" structure (meta object model of the framework program).

FIG. 7 shows how a communication connection is set up between the MES applications MES' and MES". These MES applications MES' and MES" are mapped to the "component" structure of the framework program (IF; FIG. 2) via adapters or wrappers. The underlying means of communication (HTTP, MSMQ, DCOM, etc.) are also mapped to the generic object model of a "component" structure via adapters or wrappers. In the framework program (IF; FIG. 2), these means of communication are then represented by means of a component transport system (TS). This component transport system (TS) ignores the underlying means of communication. In setting up a communication link, therefore, it does not matter which is ultimately the underlying physical means of communication. The means of communication are therefore essentially interchangeable.

The communication link between the MES applications MES' and MES" is set up by means of what is referred to as a "connection". A connection connects any two objects of the object model. Since the connection refers to objects of the generic object model, it knows their semantics and knows what special features must be set up in making the connection, i.e. method objects must be manipulated differently from pure data objects, for example. Furthermore, the connection is supported by a transport system. The transport system is also present as part of the generic object model of the framework program (IF; FIG. 2). A connection can be uni-directional or bi-directional.

Data flowcharts can be used for projecting the communication link between applications, by connecting the nodes by means of corresponding data flows.

Figure 8:
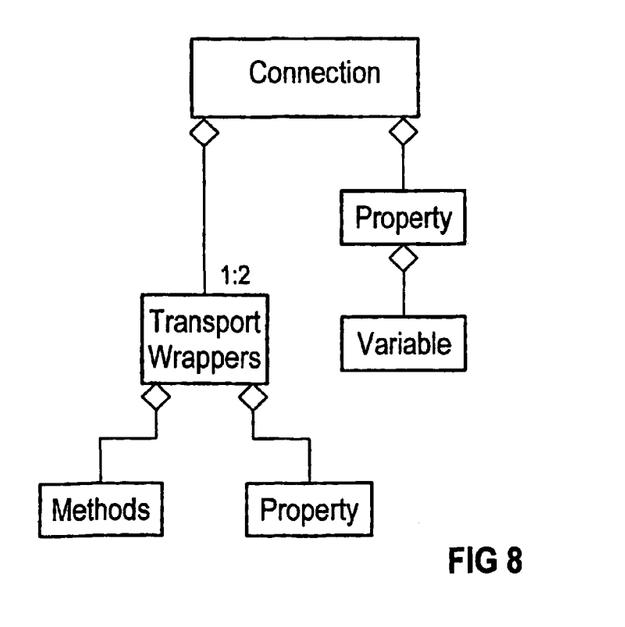

The diagram in FIG. 8 shows the object structure of a "connection" in UML notation. A connection is a generic object which consists fundamentally of two parts: firstly the wrappers of the specific means of communication and secondly a collection of properties, i.e. characteristics which can be set via this means of communication. These properties and the connection itself are in turn "components" of the object model, with the properties being given simply by means of a list of variables. A transport wrapper in turn also contains properties, i.e. characteristics. If MSMQ is used as the means of communication, the name of the message queue used is a property of this type, for example. The cardinality (1:2) indicates that the connection in FIG. 8 incorporates at least one but no more than two transport wrappers. The other aggregation links (lozenge symbol), as shown in FIG. 8, can also incorporate cardinalities. A transport wrapper can also incorporate methods, such as a method for opening a specific transport channel, a method for closing a specific transport channel, a method for sending a string, a method for receiving a string, etc.

Means of communication are usually mapped to the object model of the framework program by means of wrappers, but it is also possible in principle to integrate means of communication in the framework program by means of adapters.

Figure 9:
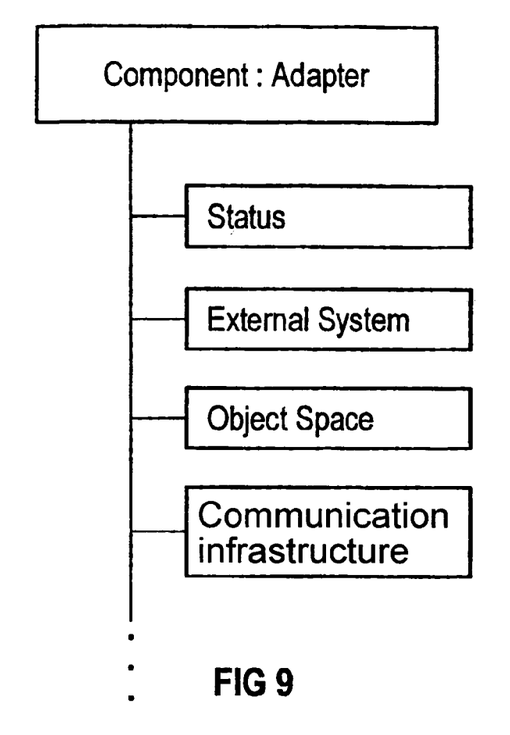

The diagram in FIG. 9 shows the schematic structure of an adapter. Each adapter is a specific component with the special property that the component of an adapter runs in a dedicated process in each case. Each adapter already brings a certain default structure with it, which again is represented as a tree structure of objects of the framework program, i.e. components and variables, and which makes certain points available at which the adapter can deliver certain information to the outside. Examples of this comprise status information about the status of the adapter (is the adapter connected to its application, is the application running, version information, etc.). Furthermore, an adapter can also deliver information about the external system, i.e. the external application, to the outside. An adapter can deliver structures to the outside which other adapters or other applications can access by means of the "Object Space". An adapter can also deliver information with respect to a communication infrastructure to the outside. 'Communication infrastructure' means objects for sending, receiving and converting messages but also mechanisms for performing routing and mechanisms for logging the exchange of data in the adapter. Furthermore, the communication infrastructure of an adapter includes what are referred to as inports and outports which physically receive or send the messages. An adapter is present as a dedicated process of the operating system, i.e. if an adapter crashes, it has no impact on other adapters. An adapter is therefore a dedicated enclosed application which can be executed on its own.

Adapters and wrappers are mechanisms for integrating software components into a software system. A wrapper maps the API (Application Programmable Interface) of a foreign component or an application to be integrated into the object model of the software system, in this case the framework program (IF; FIG. 2). Thus, for example, a method of the API of the application to be integrated becomes a method of the framework program or an integer data type of the API of the application to be integrated becomes an integer data type of the framework program, etc. A wrapper therefore brings the API of the application to be integrated into the language, into the nomenclature and into the object world of the framework program.

An adapter, on the other hand, is one level of abstraction higher than a wrapper. Adapters represent a standardized view of applications to be integrated and the framework program into which the application to be integrated is inserted can ignore that application. An adapter makes functionality available to start up, operate and handle the system to be integrated, i.e. the application to be integrated. With the aid of adapters, for example, a user can use a SAP application without being a SAP expert. SAP applications are mapped into the object model of the framework program by means of the IDOC adapters (see FIG. 6) and are then used as objects of the framework program (component IDOC).

Two applications (e.g. MES applications) can be brought together on a peer-to-peer basis by means of the system and method according to the invention without a connection of this type having to be programmed on a peer-to-peer basis in each case. These connections are projected according to the invention by establishing a connection (see FIG. 7).

Figure 10:
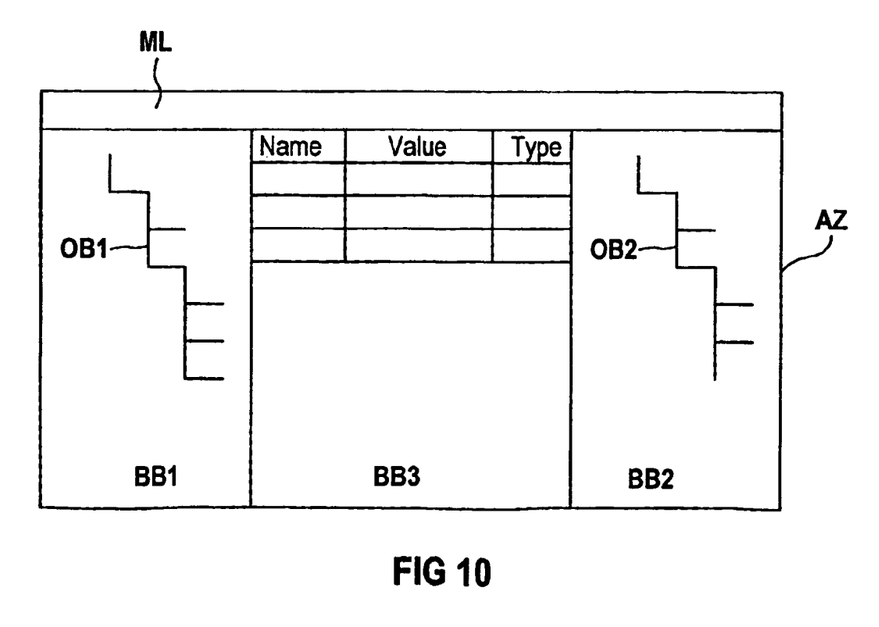

The diagram in FIG. 10 shows a projection user interface for setting up a communication connection between applications. The display device AZ (e.g. a monitor or a display) possesses one or more menu lists ML. The menu lists ML contain function buttons which can be activated by the user by way of a mouse click, for example. Self-defined function buttons can also be stored in the menu lists ML by the user. Operation or activation of the projection interface can also be effected via other input tools (e.g. keyboard, light pen or the like). In FIG. 10, the projection user interface is divided into the screen areas BB1-BB3. It is also conceivable, however, that further or only one or two screen areas are present.

The object structures OB1 and OB2 of the applications between which a communication link is to be set up are shown in the screen areas BB1 and BB2. However it is also conceivable, that only the structure of the respective adapters is shown in the screen areas BB1 and/or BB2. A user can now connect elements of the two object structures OB1 and OB2 to each other via drag & drop mechanisms. If a user sets up a communication link of this type, information with respect to this connection or the connections is shown in a screen area BB3. Information of this type can refer to the name, value or type of the connection set up. It is also conceivable that further information is shown with respect to a connection. By means of the mechanism described in FIG. 10, it is possible for a user to project communication links between two applications. Communication links between two applications therefore no longer need to be programmed individually. Efficiency in the creation of software solutions for MES systems rises enormously as a result and System Integrators and System Developers in particular can increase their efficiency.

Applications to be connected, particularly MES applications, but also the communication mechanisms, are mapped into the object model of the framework program (Industrial Framework) by using wrappers and/or adapters and, as a result, can be manipulated in a uniform homogenous manner in the framework program (Industrial Framework). The invention is advantageous in that the very heterogeneous structures of the applications are mapped onto a common model and can be used very conveniently and easily by a user by means of generic mechanisms (Object Component as meta object model). That is to say that the effort of programming is eliminated and, as a result, this communication can be projected by establishing what is referred to as a connection.

The system or method according to the invention described above can be implemented as a computer program in languages known for the purpose. A computer program implemented in this way can be stored and transported via electronic data pathways, but also on data carriers, in a similarly known manner.

The invention claimed is:

1. A system for communicating between MES (Manufacturing Execution Systems) software applications, comprising:
at least one mechanism of communication;
at least one central processing unit for storing the MES software applications; and
at least one framework program coupling the MES software applications, wherein the MES software applications are mapped to an object model of the framework program, wherein
the mechanism of communication is mapped to the object model of the framework program, wherein
a communication link is set up between two or more objects of the object model by connecting methods of the objects and/or data of the objects and/or the objects themselves, wherein
an exchange of data and/or information and/or events takes place over the communication link, wherein any desired data and/or information and/or events of the MES software applications are exchanged over the communication link independently of the internal format of the respective MES software applications and/or independently of the underlying format of the mechanism of communication, wherein
one mapping of one of the MES software applications to the object model of the framework program is effected by an adapter comprising a tree structure of the objects of the framework program, including components and variables, and which delivers information about the application, data structures of the application, objects for sending, receiving and converting messages to and from the application, a mechanism for performing routing, and a mechanism for logging an exchange of data in the adapter to and from the application and the industrial framework program, wherein others of the adapters and other applications can access objects of said one mapping by means of the object model of the industrial framework program, and wherein the adapter runs in a dedicated process that has no impact on other adapters in case the adapter crashes.

2. A system as claimed in claim 1, wherein the communication link is transparent for a user and/or other systems with respect to the underlying mechanism of communication.

3. A system as claimed in claim 2, wherein the mapping to the object model is effected by an adapter and/or by wrapping.

4. A system as claimed in claim 2, wherein the communication link is set up with a display device having input tools and/or via an autonomously operating program.

5. A system as claimed in claim 1, wherein the mapping to the object model is effected by an adapter and/or by wrapping.

6. A system as claimed in claim 5, wherein the communication link is set up with a display device having input tools and/or via an autonomously operating program.

7. A system as claimed in claim 1, wherein the communication link is set up with a display device having input tools and/or via an autonomously operating program.

8. A system as claimed in claim 1, wherein the communication link is set up between two or more objects by connecting the objects, which are shown in different screen areas of the display device, by a drag & drop operation with the aid of the input tools.

9. A method for communicating between MES (Manufacturing Execution Systems) software applications, comprising:
providing at least one mechanism of communication;
providing at least one framework program coupling the MES software applications;
storing the MES software applications on at least one central processing unit;
mapping the MES software applications to an object model of the framework program;
mapping the mechanism of communication to the object model of the framework program;
setting up a communication link between two or more objects of the object model by connecting methods of the objects and/or data of the objects and/or the objects themselves; and
providing an exchange of data and/or information and/or events via the communication link, wherein
any desired data and/or information and/or events of the MES software applications are exchanged via the communication link independently of the internal format of the respective MES software applications and/or independently of the underlying format of the mechanism of communication, wherein
one mapping of one of the MES software application to the object model of the framework program is effected by an adapter comprising a tree structure of the objects of the framework program, including components and variables, and which delivers information about the application, data structures of the application, objects for sending, receiving and converting messages to and from the application, a mechanism for performing routing, and a mechanism for logging an exchange of data in the adapter to and from the application and the industrial framework program, wherein others of the adapters and other applications can access objects of said one mapping by means of the object model of the industrial framework program, and wherein the adapter runs in a dedicated process that has no impact on other adapters in case the adapter crashes.

10. A method according to claim 9, wherein the communication link is transparent for a user and/or other systems with respect to the underlying mechanism of communication.

11. A method according to claim 10, wherein the mapping to the object model is effected by an adapter and/or by wrapping.

12. A method according to claim 10, wherein the communication link is set up with a display device by input tools and/or via an autonomously operating program.

13. A method according to claim 9, wherein the mapping to the object model is effected by an adapter and/or by wrapping.

14. A method according to claim 9, wherein the communication link is set up with a display device by input tools and/or via an autonomously operating program.

15. A method according to claim 9, wherein the communication link is set up between two or more objects by connecting the objects, which are shown in different screen areas of the display device, by a drag & drop operation with the aid of the input tools.

16. A method according to claim 9, wherein the method is implemented by a computer program.

17. A method according to claim 16, wherein the computer program is stored on a data carrier.

18. A method according to claim 16, wherein the computer program is installed on a data processing apparatus.

* * * * *